Sept. 27, 1966  L. E. ECKE  3,275,369
HOUSE TRAILER WITH RETRACTABLE PATIO ROOF
Filed Aug. 17, 1964  2 Sheets-Sheet 1

INVENTOR.
LEE. E. ECKE
BY McLaughlin & Cahill
ATTORNEYS

Sept. 27, 1966  L. E. ECKE  3,275,369
HOUSE TRAILER WITH RETRACTABLE PATIO ROOF
Filed Aug. 17 1964  2 Sheets-Sheet 2

INVENTOR.
LEE E. ECKE
BY McLaughlin & Cahill
ATTORNEYS ly at one corner of the roof member;

United States Patent Office 3,275,369
Patented Sept. 27, 1966

3,275,369
HOUSE TRAILER WITH RETRACTABLE PATIO ROOF
Lee E. Ecke, 7200 Paseo San Andres, Tucson, Ariz.
Filed Aug. 17, 1964, Ser. No. 389,862
7 Claims. (Cl. 296—23)

My invention relates to an improved trailer of the type adapted to be drawn behind a motor vehicle to provide sleeping and living quarters. It relates more in particular to an improved house trailer equipped with a side awning or patio roof-type structure which is adjustable to vertical position at the side of the trailer during vehicular transportation thereof.

House trailers which, in contemplation of the present invention, may be considered to include relatively large trailers sometimes called mobile homes, the somewhat less elaborate trailer commonly called a travel trailer and the relatively smaller trailer frequently called a camp trailer or sports trailer, frequently have a separate awning or patio roof mounted at the side and usually over the access door when the trailers are in use for living purposes. Such awnings or roofs are constructed in various ways and make use of various materials. A common arrangement is one which will permit collapsing of the awning of roof into a relatively small space so that it can be placed inside the trailer while the trailer is moved. Mobile homes are frequently set up on blocks or in other ways disposed so as to be practically stationary, and in such cases a more or less permanent patio is associated with the mobile home type of trailer. Such a patio roof is normally entirely made of metal, and frequently is not transportable with the mobile home trailer when it is moved. It has long been understood that whenever circumstances make desirable the use of an awning to shade one side of the trailer and part of the area close to such side, it is a great convenience to be able to move the trailer without leaving the awning or roof behind. Normally, moving a patio roof involves the necessity of rather extensively disassembling it. So far, however, within my knowledge no suitable construction has been provided which will at once provide all of the conveniences of easy portability of a trailer and at the same time the usual conveniences associated with conveniences established during a short or long stop-over period.

The principal object of the present invention is the provision of an improved house trailer.

Another object is the provision of a house trailer having a patio roof, awning or the like associated with it, which patio roof may be readily articulated with respect to the trailer body so that extensive dismantling of the roof or awning structure is not required.

Still another object of the invention is to hinge a metal awning in the nature of a roof to an upper part of the trailer in such a manner so as to permit hinging around the support means to fasten the awning exteriorly of the trailer to permit normal vehicular transportation of such trailer.

A further object is the provision of an improved house trailer comprising a trailer body having a door therein and a roof member pivoted to the body above the door and adapted to be supported in generally horizontal position or in vertical position along the side of the trailer, and a door in such roof portion positioned with respect to the normal trailer door to provide access to the inside of the trailer when the roof is in vertical position.

A still further object is the provision of a trailer as identified in the preceeding objects which may be effectively sealed to prevent the passage of water through the door in the said roof and between the said roof and the house trailer body.

Other specific objects and features of the invention will be apparent from the following detailed description taken with the accompanying drawings wherein FIG. 1 is a perspective view showing the trailer of the present invention in condition for travel and secured in a usual fashion to a vehicle, in the case of FIG. 1 a so-called pick-up truck;

Figure 1:
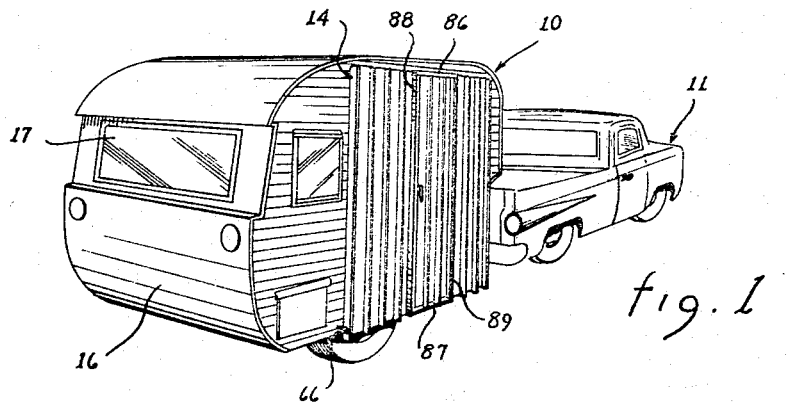
Figure 2:
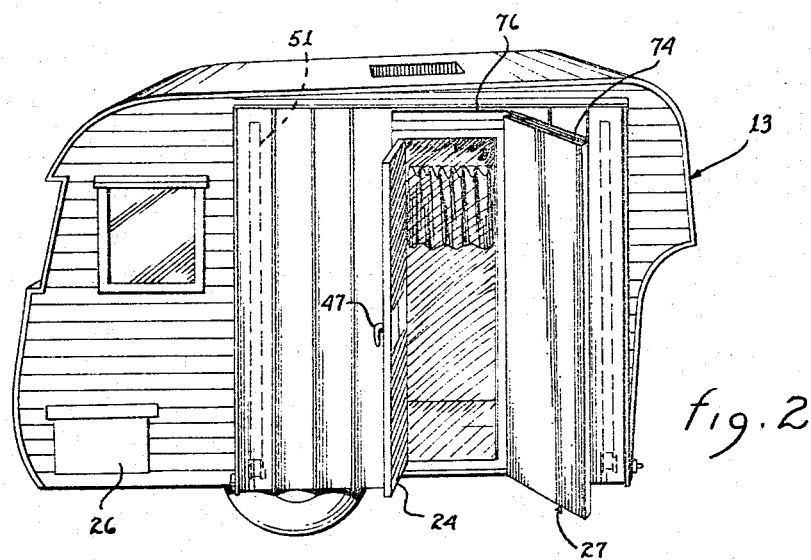
FIG. 2 shows the trailer of my present invention with both the roof door and the trailer body door open, illustrating the manner in which access can be provided to the inside of the trailer on a temporary basis during a trip and when the roof is still attached to the side of the trailer.
Figure 3:
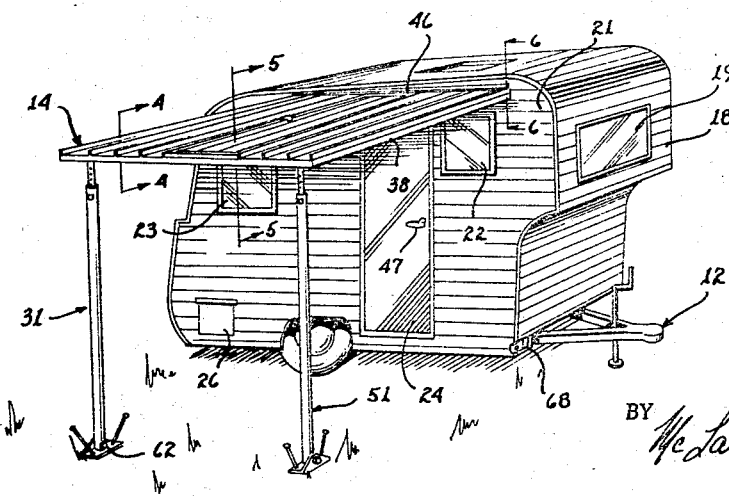
FIG. 3 is a perspective view showing the trailer in "camping" position with the roof or awning adjusted to functional position.

Referring now to the drawings as I show in FIG. 1, a sports type of trailer indicated generally by the reference character 10 in the act of being transported by a pick-up truck indicated generally by the reference character 11 which is attached to the trailer through a common type of trailer hitch as indicated at 12 in FIG. 3. The trailer is of a usual type with a body portion indicated generally by the reference character 14 hinged along the roof line at one side of the trailer and adapted to be supported in functional position in the manner shown in FIG. 3 and to be secured in position at the side of the trailer during transportation in the manner illustrated in FIGS. 1 and 2.

While the house trailer, shown in the drawings is in the form of a "camper" or sports trailer, many specific forms of "house" trailers may be employed as already explained. The trailer shown in the drawings has the usual wheels, a back wall 16 with a window 17, a front wall 18, one side wall which does not appear in the drawings and a second side wall 21 provided with windows 22 and 23 and a door 24. A small access panel 26 is provided at the rear portion of the side 21 for the introduction of materials to be stored. Usually the access panel 26 communicates with a storage space which does not communicate directly with the living quarters within the trailer.

As FIGS. 2 and 3 show, the door 24 is hinged to swing to the left looking directly toward side 21 of the trailer, and the roof member 14 is provided with a swinging door 27 disposed directly over the door 24 when the roof member 14 is in a vertical position for traveling, so that communication can be established with the inside living quarters of the trailer 10, as shown in FIG. 2, without the necessity of raising the roof member 14 to the position shown in FIG. 3. The door 27 which may be in sliding relation with the roof member 14 or opened in any other suitable way, preferably is larger than the door 24 to allow the door 24 to be opened freely just as if the roof member 14 did not exist.

Figure 4:
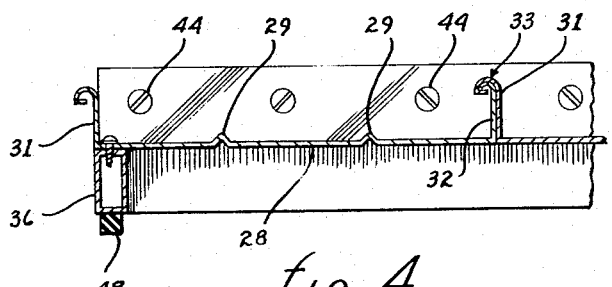
FIG. 4 is a slightly enlarged sectional view taken along the line 4—4 of FIG. 3 showing one manner in which the body portion comprising the awning or roof may be constructed.
Figure 6:
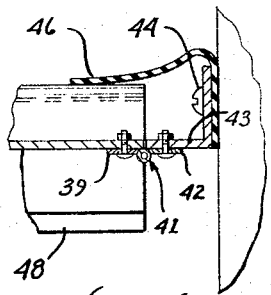
FIG. 6 is an enlarged fragmentary sectional view taken along the line 6—6 of FIG. 3 showing one manner in which the trailer roof may be hinged to the trailer body to prevent leakage between the said roof and the said trailer body.
Figure 7:
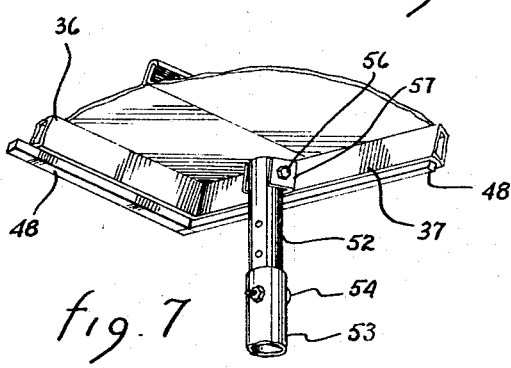
FIG. 7 is a fragmentary perspective view looking upward

I wish to note again that the unit which I call a roof member 14 is sometimes called an awning in the trade and sometimes called a patio roof. For the purpose of my invention and its description the terms can be used interchangeably. The roof member 14 can be formed in various ways of many different types of materials, but I have found it advantageous to use relatively light weight aluminum in the form of individual interlocking panels 28 (FIG. 4) with a plurality of reinforcing corrugations 29 and upstanding side edges 31 and 32 which may be interlocked in the general manner indicated at 33 in FIG. 4. The roof member 14 also has marginal strips 36, 37 and 38 (FIGS. 3 and 7) around the sides and front thereof. A similar strip may be provided at the rearmost portion of the roof member, but in general I have found that framing at this edge of the roof member 14 is not required. A plurality of leaves 39 of a plurality of hinges 41 (FIG. 6) may be secured to the rear edges of the panels 28, the opposite leaves 42 of the springs 41 being secured to one leg of an angle member 43, the remaining leg of the angle member 43 being secured to the side 21 of the trailer generally at its roof line by means of screws 44. A continuous hinge 41 may, of course, be used such as the so-called and well-known "piano hinge" to provide more complete reinforcement for the rearmost edge of the roof member 14. To prevent leakage between the body of the trailer and the roof member 14, I secure a strip 46 of rubber, flexible plastic or the like under the angle 43 and cause it to project over the top edge of the roof member 14 as shown in FIG. 6.

Even though the panel strips 28 may be made relatively thin and individually fragile, their use results in the production of a very light but strong roof member 14. By extending the corrugations 29 and the projections 31 and 32 upwardly, the ceiling portion of the roof as seen by the occupants in FIG. 3 presents a very smooth appearance. This arrangement also provides a recess extending from side member 36 to the side member 38, so that the trailer roof member 14 may be brought down firmly against the side wall 21 of the trailer body notwithstanding the existence of various projections such as of the door handle 47. Preferably, a resilient sealing strip 48 is secured around three sides of the roof member 14 and to the members 36, 37 and 38, as the drawings show, so that the roof member 14 may be held tightly against the side of the trailer without marring its surface and without causing drum-like vibration between the two contacting surfaces comprising the trailer side member 21 and the roof member 14.

To support the roof member 14 in generally horizontal position as shown in FIG. 3, I employ outside supporting posts indicated generally by the reference character 51. These supporting posts 51 consist of smaller tubes 52 telescoped within larger tubes 53 releasably supported in adjustable relation with respect to each other by fastening members 54, suitable pins or common nuts and bolts extending through two of a series of openings in the tubular members. The smaller tubes 52 are hinged by means of pintles 56 to brackets 57 carried by the front framing member 37. A base member comprising a plate 58 with a right angular upward projection 59 is provided to releasably attach the bottom of the post to a selected position on the ground. The bottom end of the larger tubular member 53 is pivoted to the upward projection 59 by means of a pin 61 which may be an ordinary pin or bolt and which may also utilize a fastening nut 62 as shown in FIG. 3. The base plate 58 is apertured to permit metal pins 63 to be driven therethrough and into the ground to anchor the base member and bottom of supporting parts 51. It is obvious that, by this construction, the roof may not only have its slope adjusted with respect to the horizontal, but adjustment can also be made for irregular ground at a camping site. The arrangement permits the supporting posts 51 with the upper bracket 57 and bottom base members to be folded upwardly and housed between the roof member 14 and trailer, in the manner indicated in broken lines in FIG. 2. The supporting posts 51 may also be removed entirely if desired, and lodged in the storage area behind the access panel 26. I have found either arrangement to be satisfactory, although when relatively short trips are made with frequent stopping, it appears to be preferable to store the posts 51 in the manner shown in FIG. 2 even though there may be some slight rattling noise associated with this arrangement.

Figure 9:
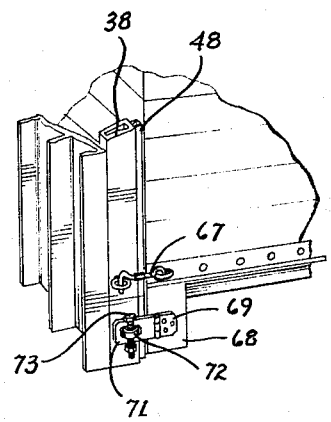
FIG. 9 is a fragmentary perspective view looking at the right-hand lower corner of the trailer as it appears in FIG. 1, illustrating the manner in which the roof member is secured in position along the side of the trailer body.
Figure 8:
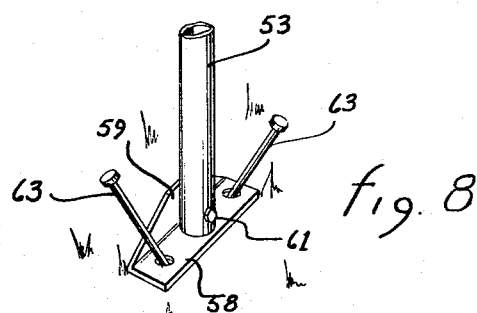
FIG. 8 is a fragmentary perspective view showing the roof member support secured in position on the ground.

When the roof member 14 is to be placed in the position shown in FIGS. 1 and 2, it is secured in position by suitable means as shown in the drawings. Illustratively, a simple form of hook 66 may be employed at the rear bottom edge of the roof member 14 as shown in FIG. 1 with a similar hook or latch 67 at the bottom forward edge. It will be noted that in the form shown, the panel assembly comprising the roof member 14 extends slightly below the bottom edge of the trailer body. This is particularly noticeable by reference to FIG. 9. I then provide a bottom projection 68 at the lower corner of the front wall 18 of the trailer and secured thereto one leaf 69 of a hasp, the free leaf 71 of which is provided with a slot which extends over a staple 72 so that a suitable fastening member 73 may be secured firmly in position. In the drawings, the fastening member 73 is shown as a nut and bolt but it may be any suitable fastening or locking device such as an ordinary padlock.

The door 27 is supported snugly and in a special manner within the panel comprising the roof member 14 so as to be, for all practical purposes, integral therewith and to provide a firm seal against leakage in the event of rain between the door and the remaining portion of the roof member. The structure of the door 27 may be seen in part by reference to FIGS. 1, 2 and 3. The structure appears more in detail in the fragmentary enlarged sectional view of FIG. 5.

The door is formed of a number of panels 28 and has an outside reinforcing frame comprising generally rectangular frame members 86, 87, 88 and 89. The four frame members are secured together and the frame members 88 and 89 are in abutting relation to the projections 31 and 32. Suitable attachment to these projections results in the formation of a firm, rigid door structure. The members 88 and 89 comprising stiles may, of course, be formed in any suitable manner but the structure shown has the advantage of lightness and the provision of adequate rigidity.

Figure 5:
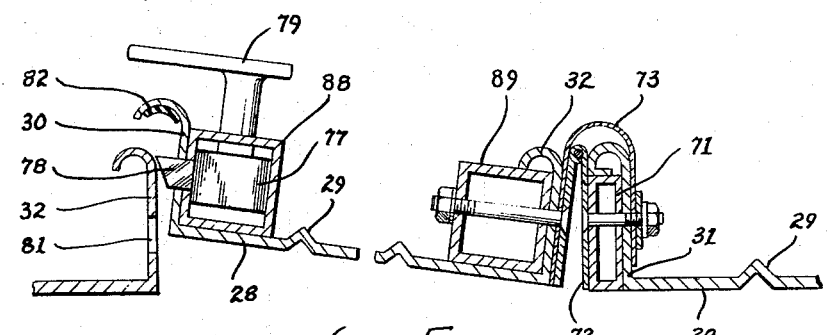
FIG. 5 is an enlarged fragmentary sectional view taken along the line 5—5 of FIG. 3 showing one way in which the door in the roof or awning may be constructed.

A rectangular side member 71 forms a muntin-like side post for the attachment of one leaf of hinges 72, such side post 71 being secured to a projection 31 of one of the panels 28. A pliable strip 73 of sheet rubber, plastic film or the like is secured in position over the hinges 72 as shown in FIG. 5 and extends the full length of the door to seal the space between the side post 71 and door 27. A plastic or the like strip 74 is secured to and projects upwardly from the frame member 86 and engages against a cross piece 76 to seal the door 27 at its top.

A latching member 77 is supported within the frame member 88 and has a spring-pressed latch 78 retractable by the operation of a handle 79. The latch 78 is engageable in a recess 81 in the member 32 in alignment with the latch 78, so that the member 32 in the vicinity of the aperture 81 functions as a striking-plate. The member 31 to which the frame member 88 is attached normally has an inwardly projecting flange, but this flange is removed. For clarity the projection (normally 31) at the left of the panel 28 is identified by the reference character 30. A sealing liner 82 formed of flexible material such as soft rubber extends the full length of the bottom rounded surface of projection 30 so as to engage against the top rounded portion of the projection 32 to form a seal along the left side of door 27, looking at FIGS. 1, 2 and 3.

The manner of employing the trailer of my present invention should be clear from the previous description. The relative dimensions of the roof member 14 depend, of course, on the size of the trailer and the desires of its owner. Trailers which are box-like can have a roof member such as 14 attached in adjustable relation to either the back or front of the trailer but generally speaking I have found that the roof member, awning or patio roof, however the roof member 14 may be designated, is preferably supported at the right side of the trailer over the door which is most commonly placed at the right side of the trailer. This arrangement produces the maximum advantage in providing the new functions described and normally also permits the utilization of a roof or awning which is of considerably greater dimension than if the location would be changed. Preferably the patio roof or awning is hinged at the roof or top line of the trailer, but this arrangement may be varied depending on the trailer's height. Normally, also, the roof member does not occupy the entire side of the trailer, both because of a roof or awning of this magnitude is usually not desired or required, and also because in many types of trailers the sides of the trailer are not completely rectangular and the width of the roof member can very seldom be made co-extensive with the total over-all length of the trailer's side.

During normal movement of the trailer from place to place, it will usually not be necessary or advisable to raise the roof member to the position shown in FIG. 3, even if a short overnight stop is made. On the other hand, the roof member can be set up to the position shown in FIG. 3 so rapidly that even in the case of short stops the roof member may be used if its use will add to the comfort or convenience of the trailer's occupants. In any case, the trailer may be produced readily with width dimensions well within the regulations of all State bodies. Actually in the case of most campers and sports trailers, conventional design and dimensions may be employed and the roof member merely added to a previously existing trailer. Thus, a patio roof assembly itself may be offered for sale as a separate item and may readily be attached in a relatively short time to many standard types of trailers.

I have described my invention in detail and shown in the drawings scales of a preferred embodiment thereof so that those skilled in the art may understand the manner of practicing the invention. The scope of the invention, however, is defined by the claims.

I claim:
1. In a house trailer,
   (a) a trailer body having a front, rear and two side walls, with a trailer top above and connected to said walls,
   (b) a generally planular roof member secured by horizontal spring means to a side of said body approximately at the line of said trailer top, said trailer side having a door therein,
   (c) means supporting said roof member to said trailer side for travelling,
   (d) support means for an unhinged portion of said roof member to hold it in a generally horizontal position while attached to said trailer side,
   (e) means forming a door like opening in said roof member framing said trailer door when the roof member is in supported position against said trailer side to provide access to the trailer, and
   (f) a door hinged on the roof member and adapted to close said door like opening.

2. A trailer as defined in claim 1 including means for preventing leakage of rain water or the like through said door like opening in said roof member.

3. A trailer as defined in claim 1 wherein said supporting means comprises at least one telescoping member attachable to an outer edge of said roof member.

4. A trailer as defined in claim 1 wherein said supporting means comprises at least one telescoping member pivotally supported at an unhinged portion of said roof member, and a base pivotally connected to a bottom end of said telescoping member.

5. A patio roof member adapted for attachment to a house trailer body having a door therein comprising
   (a) a plurality of metal strips interlocked to form a rectangular metal panel,
   (b) hinge means secured to one side edge of said panel for attaching the same to a top edge of a side of a trailer,
   (c) means forming a door opening in said panel, said door opening being larger than a door opening in said trailer body,
   (d) adjustable door means carried by the said panel for closing said door opening therein, and
   (e) means for sealing side edges of said opening to said door means to prevent water leakage through said door opening when the door means are closed and the said patio roof member is in general horizontal position.

6. A patio roof as defined in claim 5 wherein said door comprises a plurality of interlocking panels substantially identical with said patio roof panels, and a marginal frame engaging and disposed within projections forming a part of said panels, said side post comprising a frame member disposed outside one of said projections.

7. A patio roof member adapted for attachment to a house trailer body having a door therein comprising
   (a) a plurailty of metal strips interlocked to form a rectangular metal panel,
   (b) hinge means secured to one side edge of said panel for attaching the same to a top edge of a side of a trailer,
   (c) means forming a door opening in said panel,
   (d) a side post at one edge of said door opening,
   (e) a door hinged to said side post,
   (f) means sealing edges of said door to the side panel when the door is closed to prevent water leakage through said roof around said door, and
   (g) said door opening adapted to lie over a door in the trailer body when said patio roof is hinged to the trailer side.

References Cited by the Examiner

UNITED STATES PATENTS

| | | | |
|---|---|---|---|
| 2,618,820 | 11/1952 | Strnben | 296—23 X |
| 2,706,132 | 4/1955 | Chaffin | 296—23 |
| 2,720,885 | 10/1955 | Legg | 135—5 |

BENJAMIN HERSH, *Primary Examiner.*

P. GOODMAN, *Assistant Examiner.*